United States Patent Office 2,831,013
Patented Apr. 15, 1958

2,831,013

SULFO-ESTERS OF ALCOHOLS BEARING A HYDROPHILIC SUBSTITUENT

Victor Mark, Evanston, Ill., assignor to Universal Oil Products Company, Des Plaines, Ill., a corporation of Delaware No Drawing. Application December 30, 1953
Serial No. 401,431

6 Claims. (Cl. 260—456)

This application relates to compositions of matter herein characterized as sulfo-esters and to a process for the preparation of said esters. Some of the specific applications of the invention concern certain types of sulfo-esters which have surface activity in aqueous or anhydrous solvents, said esters being the products formed by esterifying a hydrocarbon sulfonic acid with an hydroxy-substituted organic compound having an additional hydrophilic substituent which balances the effect of the hydrophobic hydrocarbon group in an appropriate solvent therefor such as water, hydrocarbon and ester-oils, alcohols, etc.

In one of its embodiments the present invention relates to a hydrocarbon sulfonic acid ester of an alcohol bearing a hydrophilic substituent.

Another embodiment of the invention is directed to a process for the preparation of a hydrophilically substituted sulfo-ester compound which comprises condensing a mono-hydrocarbon substituted sulfonyl derivative with a compound bearing a hydrophilic substituent and containing a group condensable with said sulfonyl derivative to yield said sulfo-ester.

A more specific embodiment of the invention relates to a process for the preparation of a surface active compound which comprises condensing a mono-hydrocarbon substituted sulfonyl derivative with a hydrophilically substituted hydroxy compound condensable with said sulfonyl derivative and selected from the group consisting of an alcohol and a phenol, the hydrocarbon substituent of said sulfonyl derivative containing at least 8 carbon atoms when alkyl and at least 11 carbon atoms when a member of the group consisting of the mono- and dicyclic cycloalkyl, aryl, aralkyl, alkylaryl, hydroaryl, hydroaralkyl and hydroalkylaryl radicals.

The compounds of this invention are utiized primarily, although not necessarily, as surface active agents, certain members of the series being emulsifying agents, while others are highly effective detergent and wetting agents. Depending upon the molecular structure and also upon whether the hydrophilic group present in these compounds has an active, water-solubilizing effect on the compound as a whole, individual members of the series may be soluble in water or alternatively may be preferentially soluble in organic solvents such as alcohols, liquid hydrocarbons, etc. Thus, certain members of the present series of products may have a highly effective water solubilizing group in their molecular structure and may be utilized for detergent purposes in aqueous systems, such as for laundering. Other individual members of the present series of compounds may have a relatively more active hydrophobic group in their molecular structure and may be more effective as surface active agents in non-aqueous solvents, such as lubricating oils, etc. In general, the classification into which any particular compound may fall is dependent upon the number, size and specific character of the respective hydrophilic and hydrophobic portions of the molecule.

The compositions of the present invention, including the products useful as surface active agents, are characterized essentially as alcohol or phenol derivatives of hydrocarbon sulfonic acids in which the portion of the ester molecule considered as being derived from the alcohol or phenol bears at least one hydrophilic substituent. These compounds, which are essentially sulfo-esters, in general have the following structure: R—SO$_2$—O—R'X wherein R represents a hydrocarbon group, R' a polyvalent organic radical, being the organic residue attached to an hydroxyl group of the original alcohol, phenol or ester reactant utilized in the preparation of the present sulfo-esters, and X represents a hydrophilic substituent or a radical which possesses the property of increasing the water-solubility of the composition as a whole. The members of the above series of compounds which have surface active properties in aqueous or non-aqueous solvents are selected from the sulfo-esters in which the hydrocarbon group, R, of the composition is selected from alkyl groups containing at least 8 carbon atoms per group and from cycloalkyl, aryl, aralkyl, alkylaryl, hydroaryl, hydroaralkyl, and hydroalkylaryl, containing at least 11 carbon atoms per hydrocarbon substituent, the latter hydrocarbon groups providing the requisite hydrophobic portion of the resultant composition which is essential to the development of surface activity or detergency in the final product. In the production of the present sulfo-ester type compositions which have surface activity, the following Table I presents a number of suitable hydrophobic hydrocarbon groups and their structural configuration which may be utilized in the preparation of the surface active members of the present compositions:

TABLE I

*Typical hydrophobic-hydrocarbon substituents in surface active sulfo-esters*

Alkyl:

$$C_nH_{2n+1}$$
$$n=8–30$$

Aryl, mononuclear:

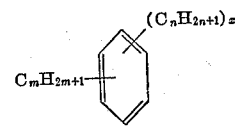

$n=1, 2, 3$
$x=0, 1, 2$
$m=5–18$, provided that $xn+m$ is $>11$

Aryl, di-nuclear:

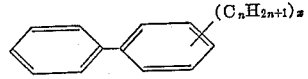

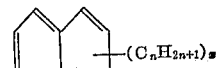

$n=1–9$
$x=0, 1, 2, 3$

Aralkyl, mononuclear:

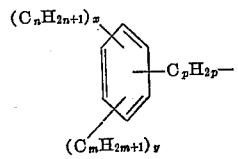

$n=1, 2, 3$
$m=5–18$
$p=1–5$
$x=0, 1, 2$
$y=0, 1$

Hydroaryl, hydroalkylaryl and hydroaralkyl: Partial and complete hydrogenation products of the above aryls and aralkyls.

Typical alcohols and phenols bearing a hydrophilic group which in themselves or in the form of these derivatives condense with an appropriate hydrocarbon sulfonyl derivative to form the present sulfo-ester product having surface activity are illustrated, together with their structural configuration, in the following Table II:

TABLE II

*Typical alcohol and polyol derivatives containing hydrophilic groups utilizable in forming surface active sulfoesters*

Alkanol sulfonates:

$n = 1-10$
M = electropositive, salt-forming metal or ammonium radical

Polyol sulfates:

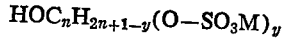

$y = 1-5$ but does not exceed $n$
$n = 1-10$
M = hydrogen or an electropositive salt-forming metal or ammonium radical α,ω-Dihydroxy-polyoxyalkylene:

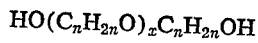

$n = 2-5$
$x = 1-50$, where $x$ represents an average of the number of polyoxyalkylene units in a given mixture of compounds α-Hydroxy-polyoxyalkylenesulfate:

$n = 2-5$
$x = 1-50$, representing an average of the number of poly-oxyalkylene units in a given mixture of compound
M = hydrogen or an electropositive metal or ammonium radical Mono-hydroxycyclo-alkyl sulfates:

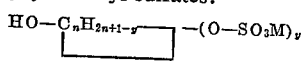

$n = 5-6$
$y = 1-5$
M = hydrogen or an electropositive metal or ammonium radical Hydroxyaromatic sulfonates:

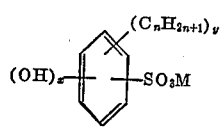

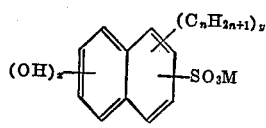

$x = 1-3$
$y = 0, 1, 2$
$n = 1, 2, 3$
M = hydrogen or an electropositive metal or ammonium radical Aralkylol sulfonates:

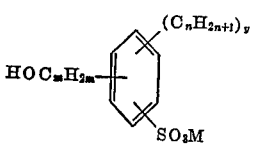

$n = 1, 2, 3$
$m = 1-6$
$y = 0, 1, 2$
M = hydrogen or an electropositive metal or ammonium radical Hydroxy acids
Aliphatic:

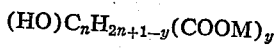

$n = 1-10$
$y = 1, 2, 3$
M = hydrogen or an electropositive metal or ammonium radical Aromatic:

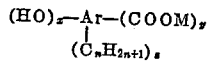

Ar = mono- or dicyclic aryl or hydroaryl
$n = 1, 2, 3$
$x = 1, 2, 3$
$y = 1, 2$
$z = 0, 1, 2$
M = hydrogen or an electropositive metal or ammonium radical Mono- and polyalkanol amines:

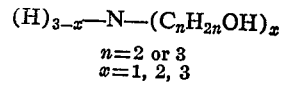

$n = 2$ or $3$
$x = 1, 2, 3$

α-Hydroxy-polyoxyalkylene-ω-(N-polyalkanol)-ammonium sulfate:

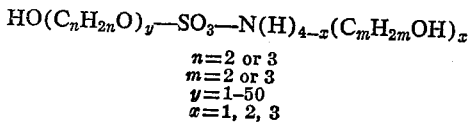

$n = 2$ or $3$
$m = 2$ or $3$
$y = 1-50$
$x = 1, 2, 3$

The products of the present invention, referred to herein as sulfo-esters, contain a hydrocarbon group of the type illustrated in Table I, above, a sulfonyl group (—SO₂—) substituted on the hydrocarbon portion of the molecule and an oxy-substituted organic radical bearing a hydrophilic substituent (—OR'X) joined to the other valence bond of the sulfono group through the oxy-linkage. Thus, compounds within the scope of the present invention have the following general structural formula:

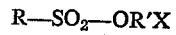

wherein R is a hydrocarbon group containing at least 8 carbon atoms, —SO₂— is the sulfonyl group, R' is a polyvalent organic radical, X is a hydrophilic substituent on the organic portion of the compound and the combination of —OR'— and —X= represents a hydrophilically substituted organic radical derived from a mono- or a polyhydric alcohol or phenol. In one of the specific embodiments of this invention wherein a surface active agent is a desired end product of the present process, the hydrocarbon group, R, of the above structure is a radical having hydrophobic properties, such as an alkyl group containing at least 8 carbon atoms per group, a cyclic hydrocarbon radical or a mono- or dicyclic aryl, cycloalkyl, alkylaryl, aralkyl or a partialy or completely hydrogenated aryl, alkylaryl, or aralkyl containing at least 11 carbon atoms per group and having the structure hereinabove illustrated and provided in Table II. Another specific embodiment of this invention concerns detergent products and the process for their preparation, in which compounds, the effect of the hydrophilic substitutent substantially balances the effect of the hydrophobic hydrocarbon substituent in a solution of the resulting compound, the products having detersive qualities comprising a special class of surface active agents which not only reduce the surface tension of solvents such as water and organic liquids, but also have the additional qualities essential for detergency and are thereby capable of cleaning soiled articles washed in a solution of the product. This invention is particularly directed to the production of those compounds having detergency in a suitable solvent therefor and their chemical configuration may contain one or more hydrophilic substituents per molecule, as required, to provide a composition in which the hydrophilic effect of the group is sufficient to substantially counterbalance the effect of the hydrophobic hydrocarbon group in solution. The number of such hydrophilic substituents required for detergency is generally not greater than one substituent per molecule, although as many as 4 may be present in the structure of the compound to provide the desired degree of surface activity.

Typical compounds which have detersive properties when dissolved in an aqueous or non-aqueous solvent include, among others, the following, which by no means exclude others and are here specified merely for illustrative purposes with no intention of limiting the process or products exclusively to the following:

$$C_{12}H_{25}-SO_2(O-C_2H_4)_nOH$$
[ω-Hydroxy-poly-(oxyethylene)]-dodecylsulfone Where $n$ is a whole number having a value of from 1 to about 25, representing an average for a mixture of compounds. Compounds of this structure may be prepared by sulfonating with fuming sulfuric acid, oleum or sulfur trioxide a dodecane, preferably n-dodecane, to form the corresponding dodecyl sulfonic acid and thereafter reacting, at esterifying reaction conditions, the sulfonic acid with a polyethylene glycol (an α-hydroxyethyl-ω-hydroxyethoxy-poly-oxyethylene). The product may also be prepared from the sulfonyl chloride, which in turn may be made by the chlorosulfonation of dodecane with sulfuryl chloride, with chlorosulfonic acid, or with chlorine and sulfur dioxide. Instead of utilizing the poly-(oxyethylene) glycols, in the esterification reaction, ethylene glycol may itself be initially reacted to form the corresponding ester of the monomer glycol in which the sulfo group of the sulfonic acid or the sulfonyl chloride esterifies one of the glycol hydroxyl groups, and thereafter reacting the ω-hydroxy ester with ethylene oxide or an ethylene halohydrin at condensation reaction conditions and for a reaction period of sufficient duration to incorporate the desired number of oxyethylene units into the molecule of the resulting sulfonic acid ester.

Other poly-(oxyalkylene) glycols, such poly-(oxypropylene) glycol, α-hydroxypropyl-ω-hydroxypropoxy-poly-(oxypropylene), the polybutylene glycols, α-hydroxybutyl-ω-hydroxybutoxy-poly-(oxybutylene), and the polyamylene glycols, α-hydroxyamyl-ω-hydroxypentoxy-poly-(oxyamylene), or the $C_3$, $C_4$ and/or $C_5$ alkylene oxides, such as propylene oxide, butylene oxide, or amylene oxide may also be utilized in the reaction to form the corresponding esters containing an average of from 2 to about 25 oxyalkylene units per molecule. Similarly, in place of the poly-(oxyalkylene) glycols, the corresponding halohydrins, such as the α-bromo- and α-chlorohydrin derivatives of the glycols may be utilized in the condensation reaction with the sulfonyl chloride or sulfonic acid intermediates. In accordance with still another method of preparation, the sodium salt of dodecyl sulfonic acid may be reacted with an ω-halogen-substituted alcohol to form the ω-hydroxy-alkyl-dodecylsulfonate, which is thereafter condensed with an alkylene oxide, such as ethylene oxide to produce the hydrophilic poly-oxyalkylene chain. In general, in reactions utilizing an alkylene oxide or an alkylene halohydrin, the intermediate sulfonyl halide or sulfonic acid derivative of the hydrophobic hydrocarbon must be initially reacted with a mono-glycol in order to provide a chain starter having a terminal hydroxyl group, although the sulfonic acid itself may be used directly.

A more water-soluble compound and one containing a more hydrophilic radical in the structure may be produced by sulfating the terminal hydroxyl group of the poly-(oxyalkylene) chain, thereby producing a compound of the following structure, in the case of the dodecyl-poly-(oxyethylene)-sulfonate derivative:

$$C_{12}H_{25}-SO_2-(O-C_2H_4)_n-OSO_3M$$
[ω-Sulfato-poly(oxyethylene)]-dodecylsulfone where $n$ is a whole number having a value of from 1 to about 25, M is hydrogen or an electropositive metallic radical, such as sodium, potassium, ammonium, etc.

A particularly preferred product of the type characterized as a poly-(oxyalkylene) glycol condensation product of the hydrocarbon sulfonic acid is represented by the following structural formula:

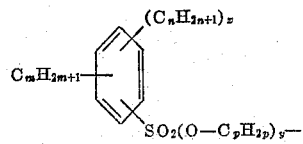

An[ω-hydroxy-poly(oxyalkylene)]-alkylarylsulfone where $m$ and $n$ are whole numbers, $n$ having a value of from 1 to 5, $m$ a value of from 5 to about 18 and $x$ is a number selected from 0, 1, and 2, provided $xn+m>11$, $p$ is 2 or 3, and $y$ has a value between 1 and about 25.

Another product of this invention, containing a different hydrophilic group, has the following structural formula, in which a long-chain alkyl group (undecyl, in the formula illustrated) represents a typical hydrophobic hydrocarbon group which may be substituted on the sulfono radical present in the molecular structure of the product:

$$C_{11}H_{23}-SO_2-O-C_nH_{2n}-COOM$$
Metal carboxyalkoxy-undecylsulfone where $n$ is a whole number having a value of from 1 to about 10 and M is selected from hydrogen and the electropositive metallic ions. In general, compounds of the above structure may be prepared by reacting a sulfonated $C_{11}$ paraffin (undecyl sulfonic acid) at esterifying reaction conditions with an ω-hydroxy aliphatic acid and thereafter neutralizing the resulting acid with a base to form the carboxylated salt, if desired. In an alternative procedure the sodium salt of undecyl sulfonic acid may be condensed with a halogen-substituted aliphatic acid (particularly a bromo or chloro-substituted aliphatic acid), and the resulting carboxylic acid condensation product neutralized, if desired to form the corresponding carboxylate salt. Other methods of synthesizing compounds of this type may be readily adapted to the production of the present compositions, methods which are apparent to chemists skilled in the art.

Still another structural variation of the present surface active agents containing a different water-solubilizing hydrophilic group is the type represented by the following structural formula:

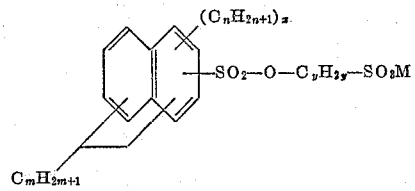

Metal (sulfo-alkoxy)-alkylnaphthalylsulfone where $n$ and $m$ are whole numbers, $n$ having a value of from 1 to 3, $m$ having a value of from 5 to 9, $x$ is a whole number having a value of from 0 to 2, $y$ is a whole number having a value of from 1 to 9 and M is selected from the group consisting of hydrogen and an electropositive ammonium or metallic radical. These compounds may be conveniently prepared by sulfonating an alkyl naphthalene hydrocarbon, neutralizing the resulting sulfonic acid with a base such as sodium hydroxide to form the sulfonate salt and thereafter reacting the sulfonate salt with a chloro or bromo-substituted sulfoalkane (a sulfonated chloroparaffin) in a condensation type reaction to form the above-indicated class of surface active products and the halide salt of the base metal ion. In place of the chloro- or bromo-substituted alkane reactant condensed with the sodium hydrocarbon sulfonate derivative, a nuclearly sulfonated aromatic halide, such as p-bromophenyl sulfonate, may be utilized in the reaction to form a derivative having the following structure (which may also be formed by sulfonation of the reaction product of a phenolate and an alkane sulfonyl halide):

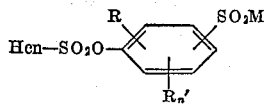

Hydrocarbon-(X-sulfophenoxy)-sulfone where Hcn is selected from the group consisting of alkyl containing at least 8 carbon atoms, up to about 20, aryl, alkylaryl, aralkyl, hydroaryl, hydroalkylaryl, and hydroaralkyl containing at least 11 carbon atoms, R and R' are alkyl groups containing up to about 5 carbon atoms per group, $n$ is a small whole number from 0 to 2, and M is hydrogen, ammonium or an electropositive metallic ion. If a sulfo-aralkyl halide (i. e., a sulfonated aryl-substituted alkyl halide) is utilized in the condensation reaction with the sodium salt of a sulfoalkane (i. e., a sodium alkyl sulfonate salt) a product of the type represented by the following formula is formed:

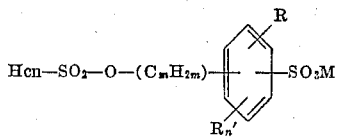

Hydrocarbon-(X-sulfo-X'-alkylphenylalkoxy)-sulfone where Hcn, R, R' and M are as indicated in the next preceding formula above, and $m$ is a whole number having a value of from 1 to about 5.

In certain members of the general class of compounds herein provided a mono- or poly-alkanolamine has sufficient hydrophilic activity in solution to provide a surface active compound when joined through an organic radical to a sulfo group bearing a hydrophobic hydrocarbon radical. The surface active members of this group have hydrocarbon radicals containing a relatively small number of carbon atoms, generally an alkyl group containing fewer than about 20 carbon atoms per hydrocarbon radical, a nuclearly alkyl-substituted aromatic hydrocarbon containing not more than about 12 carbon atoms per alkyl substituent or a nuclearly alkyl-substituted dinuclear aromatic hydrocarbon radical in which the alkyl group contain up to about 9 carbon atoms. Typical compounds of this general class are illustrated as follows:

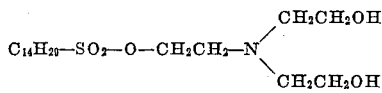

Diethanolaminoethyoxy-tetradecyl-sulfone

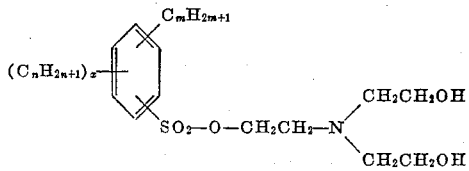

Diethanolaminoethoxy-alkylphenyl-sulfone where $n$, $m$, and $x$ are whole numbers, $n$ having a value of from 1 to 3, $m$ having a value of from 5 to about 12, and $x$ being 0, 1 or 2.

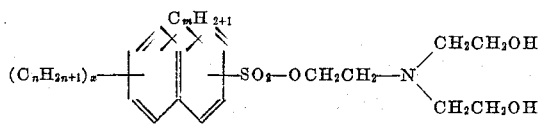

Diethanolaminoethoxy-alkylnaphthalyl-sulfone where $n$, $m$ and $x$ are whole numbers, $n$ having a value of 1 to 3, $m$ a value of from 3 to 9, and $x$ a value of 0, 1 or 2.

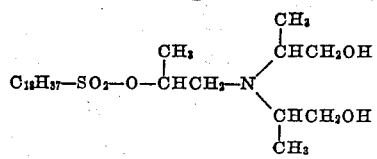

Dipropanolaminopropoxy-octadecylsulfone

Surface active sulfo esters of the above structure, wherein the hydrophilic groups are mutli-hydroxy-substituted radicals attached to the alkyl groups of a polyalkanolamine may be formed by reacting an alkanolamine (that is, a mono-, di-, or tri-ethanolamine, -propanolamine or -butanolamine) with a hydrocarbon sulfonic acid ester of a lower fatty alcohol (e. g. methanol or ethanol) or sulfonyl chloride derivative of a hydrocarbon having a hydrophobic hydrocarbon radical attached to the sulfo group thereof at reaction conditions which effect the condensation of one of the hydroxyl groups of the alkanol amine with the sulfo groups of the sulfonic acid. The resulting amine derivative may be made more soluble in water by reacting the sulfo-ester formed in accordance with the preceding condensation reaction with a mineral or organic acid of sufficient acidity to form the ammonium salt derivative of the condensation product, such as the product of the following structure formed by reacting nonylbenzene with chlorosulfonic acid to form nonylphenylsulfonyl chloride, thereafter reacting the resulting sulfonyl chloride derivative with triethanolamine and forming the hydrochloride salt of the resulting amine by adding sufficient hydrogen chloride or hydrochloric acid to the amine to convert the latter to the ammonium salt thereof:

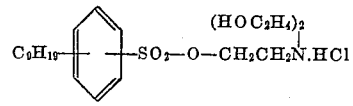

[β-(Di-hydroxyethyl)-amino-ethoxy]-nonylphenyl-sulfone hydrochloride

A surface active product having detergent properties, particularly in aqueous solution, and having more than one substituent or group of substituents possessing hydrophilic properties is represented, for example, in the composition of the following structure:

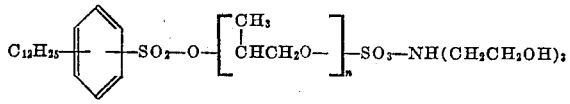

Dodecylphenyl-triethanolammonium sulfato-poly(oxypropylene)-sulfonate where $n$ is a whole number having a value from 1 to about 50, preferably from 2 to about 10. In place of the dodecylphenyl hydrophobic group illustrated in the formula, other hydrocarbon groups such as alkyl, other aryl (such as naphthalyl and adiphenyl) and other aralkyl radicals of the type shown in Table I above, may be substituted in the structure of the compound. Instead of the hydrophilic poly-(oxypropylene) group in the above compounds, poly-(oxyethylene), poly-(oxybutylene) and poly-(oxyamylene) radicals may be introduced into the structure of the product. In order to produce a product having optimum surface activity the number of poly-(oxypropylene) groups or other poly-(oxyalkylene) radicals in the hydrophilic chain is adjusted to provide a product in which the hydrophilic effect of the poly-(oxyalkylene) group is substantially balanced with respect to the effect of the hydrophobic group. Furthermore, a mixed or heterogeneous polyoxyalkylene chain, such as poly (oxyethylene)-poly (oxybutylene) may be incorporated into the structure of the hydrophilic portion of the molecule in place of a homogeneous poly (oxypolypropylene) chain. Compounds of this type may be prepared by reacting dodecylbenzene with chlorosulfonic acid at conditions whereby the corresponding dodecylphenyl-sulfonyl chloride is formed, thereafter reacting the sulfonyl chloride derivative with polypropylene glycol (or other polyalkylene glycol, either homogeneous or of the mixed type), sulfating the terminal hydroxyl group of the polyalkylene glycol monoester with concentrated sulfuric acid oleum or sulfur trioxide to form a terminal sulfate ester group, and reacting the sulfate ester with triethanolamine (or with any other basic nitrogen compound, such as ammonium hydroxide, other ethanolamines or propanolamines, pyridine, etc.) to form the desired ammonium or substituted ammonium hydroxide product.

The hydrophilic substituent in the above series of compounds, when a sulfonic acid or sulfate ester group, may generally be introduced into the structure of the compound either by reacting the previously formed detergent base with concentrated sulfuric acid, oleum or sulfur trioxide, or if the detergent is unstable in the presence of the latter reagents, by reacting a sulfonyl chloride derivative of the detergent base, such as the sulfonyl chloride derivative of the hydrophobic hydrocarbon radical with the sodium salt of the organic radical bearing the hydrophilic group. In those instances in which a poly-(oxyalkylene) group is introduced into the structure of the compound, a sulfonyl chloride derivative of the hydrophobic hydrocarbon group of the hydroxy-substituted derivative thereof is condensed with the appropriate polyalkylene glycol, or the sulfonic acid with the alkylene oxide, in the presence of catalytic amounts of a suitable base such as sodium hydroxide (dry, powdered or a caustic solution of the base), sodium acetate, pyridine, or other basic tertiary amine, continuing the reaction until the desired number of alkylene oxide units has been introduced into the poly-(oxyalkylene) chain. Suitable techniques and processes for this purpose are well known in the chemical arts without specific reference herein to processes available for this purpose.

For those compounds of the present invention which have surface activity and particularly the compounds which possess detergency in aqueous and nonaqueous solvents, the hydrophobic hydrocarbons in general balance the effect of the hydrophilic substituent when the product is dissolved in a suitable solvent therefor. The structure of the hydrocarbon portion of the molecule, in general, determines the surface activity, the solubility of the compound in particular solvents such as water, its melting point or softening point and many other physical properties of the compound when utilized as a detergent. The hydrocarbon portion of the molecule may be an aliphatic alkyl group containing at least 8 carbon atoms per group or a cyclic hydrocarbon group containing an alkyl substituent on one of the nuclear portions of the cyclic hydrocarbon ring, the products possessing surface activity containing at least 11 carbon atoms per group in the alkyl-substituted cyclic hydrocarbon portion of the molecule. When alkyl, the hydrocarbon radical may be derived from suitable petroleum fractions containing hydrocarbons of the desired chain length and these may be separated from straight run petroleum distillates, in the case of the aliphatic alkanes, or from the conversion products of petroleum hydrocarbon cracking reactions, olefinic hydrocarbon polymerization reactions, and alkylation reactions of suitable source, depending upon the molecular weight and structure of the hydrocarbon desired. Thus, in the preparation of a dodecyl sulfonic acid starting material, the tetramer fraction of a propylene polymerization product or its hydrogenated analog may be separated from the total polymeric product of a propylene polymerization process and thereafter subjected to sulfonation to form the corresponding sulfonic acid derivative. Another typical source of such aliphatic hydrocarbons containing at least 8 carbon atoms per molecule is the dehydration product of an aliphatic alcohol containing the same number of carbon atoms, the olefinic product of which may be subsequently hydrogenated to form the corresponding aliphatic alkane. Thus, lauryl alcohol (dodecanol) may be dehydrated by passing the alcohol over activated alumina to form dodecylene and the latter product may be hydrogenated by passage of the dodecylene with hydrogen over a nickel hydrogenation catalyst to form dodecane. When the hydrophobic hydrocarbon portion of the molecule is a hydroaryl or naphthenyl group, the aryl hydrocarbon containing a corresponding number of carbon atoms may be hydrogenated to saturate the hydrocarbon nucleus, or the hydrocarbon may be separated, as a naphthene from a straight run hydrocarbon distillate containing the appropriate naphthene desired. Thus, an alkyl cyclohexane may be formed by hydrogenating the corresponding alkyl benzene or it may be separated from certain straight run petroleum fractions containing alkylnaphthene hydrocarbons. When the cyclic hydrocarbon portion of the molecule is aryl, alkylaryl, aralkyl or a partially hydrogenated analog of these aryl hydrocarbons, the starting material may be separated from the appropriately boiling petroleum distillates containing the same or from the conversion products of petroleum fractions, such as a catalytically cracked gas oil fraction, one of the common sources of benzene, toluene, the xylenes or other desired alkyl aromatic hydrocarbon.

The hydrocarbon starting materials herein characterized as alkyl aromatic hydrocarbons or hydroalkylaryl hydrocarbons, in which the alkyl group contains at least 5, up to about 20 carbon atoms per group, for the production of specific types of surface active agents, generally must be prepared in a preliminary stage of the process by alkylation of the corresponding cyclic hydrocarbon nucleus. Thus, benzene, toluene, xylene, ethylbenzene, cumene, butylbenzene, naphthalene, methylnaphthalene, diphenyl, etc. may be alkylated with an olefinic hydrocarbon containing the number of carbon atoms desired in the long-chain alkyl substituent attached to the aromatic nucleus, or with an alcohol or alkyl halide having the desired number of carbon atoms, in the presence of an acid-acting alkylation catalyst to promote the condensation of the aromatic hydrocarbon and the desired alkylating agent. Thus, benzene may be alkylated with dodecylene (such as a propylene tetramer fraction) in the presence of an alkylation catalyst, such as liquid anhydrous hydrogen fluoride, concentrated sulfuric acid, aluminum chloride, etc. to form dodecyl-benzene which is subsequently utilized as the charging stock in the formation of the present sulfo-ester product as hereinabove indicated. In the production of those compounds herein characterized as alkyl naphthenes or partially hydrogenated alkylaryl hydrocarbons, the alkylated aromatic hydrocarbon may be subjected to partial or complete hydrogenation in the presence of hydrogen and a hydrogenation catalyst such as nickel supported on kieselguhr at such conditions of hydrogenation as to yield the desired partially or completely hydrogenated alkyl aromatic hydrocarbon.

The sulfonic acid derivative of the hydrocarbon utilized in the present process may be prepared by sulfonating the aliphatic alkane, the alkyl aromatic or alkyl hydroaromatic hydrocarbon corresponding in structure to the hydrocarbon portion of the product ultimately desired as the surface active agent of the present invention. Suitable sulfonating agents for this purpose include, concentrated sulfuric acid containing at least 95% sulfuric acid by weight, sulfuric acid oleums which contain free sulfur trioxide dissolved in sulfuric acid, chlorosulfonic acid, or sulfur trioxide itself in one of its allotropic alpha, beta, or gamma-forms. These form the sulfonic acid or chlorosulfonic acid derivative, which may be hydrolyzed with water to yield the corresponding sulfonic acid product or used directly. The procedures utilizable for sulfonation are generally well known in the art and may also be utilized for sulfonation of the alkane, alkylaryl and the hydroalkylaryl hydrocarbon starting materials of this invention. In those procedures in which a chlorosulfonic acid derivative of the hydrocarbon is required in the synthesis of the ultimate sulfo-ester product of this invention, the hydrocarbon starting material may be converted to the chlorosulfonic acid derivative directly by subjecting the hydrocarbon to the action of chlorosulfonic acid, or the sulfonic acid may be converted to the sulfonyl chloride by reaction with thionyl chloride, phosphorus trichloride or penta chloride, or the like.

The sulfo-ester products herein provided may be composited with other organic or inorganic materials to provide surface active or detergent compositions when the sulfo-ester product is a compound having surface activity or detergency. Thus, the sulfo-ester may be suitably composited with a builder salt or water-softening component such as sodium sulfate, sodium carbonate, ammonium sulfate, an inorganic phosphate or polyphosphate salt, such as an alkali metal or ammonium pyrophosphate, tripolyphosphate, hexametaphosphate, or other polyphosphate salt, sodium silicate, calcium or magnesium chloride, etc. or with a water-soluble cellulose derivative, such as sodium carboxy methylcellulose, or with other material which has a specific action when composited with a detergent or surface active agent.

The present invention is further illustrated with respect to several of its specific embodiments in the following examples, which, however, are not intended to restrict the generally broad scope of the invention necessarily in accordance therewith.

Example I

A compound having surface active properties in aqueous solution and having the following structural formula: $C_{12}H_{25}-SO_2-O-C_2H_4-SO_3Na$ [dodecyl-(sodium sulfoethoxy)-sulfone] is prepared by reacting sulfur dioxide and chlorine with dodecane to form the corresponding dodecylsulfonyl chloride, thereafter reacting the resulting product with ethylenechlorohydrin to form dodecyl-(2-chloroethoxy)-sulfone, and condensing the latter intermediate with sodium sulfite to form the corresponding sodium sulfonate derivative. In this process dodecane (the hydrogenated alumina-dehydration product of lauryl alcohol or the hydrogenated $C_{12}$ propylene tetramer fraction, boiling from 170° to about 225° C.) is reacted with one-third of an equivalent of chlorine in the presence of excess sulfur dioxide at a temperature of 25-35° C., under illumination of light having considerable intensity in the range 3000—5000° A., the reaction mixture being stirred during the addition of the gaseous reactants to the dodecane. The sulfonyl chloride is separated by distillation from unreacted dodecane and by-products, and is reacted with a molar equivalent of ethylenechlorohydrin in the presence of an excess of aqueous sodium carbonate at a temperature of 50° C. The organic portion of the product is extracted from the reaction mixture with diethyl ether and the chloroethyl-dodecylsulfonate component of the extract, after evaporation of the ether, reacted with anhydrous sodium sulfite at a temperature of 100° C. to introduce the sodium sulfonate group on the ethoxy radical of the product. The product is water-soluble and the desired dodecyl-(sodium-ethoxy)-sulfone is recovered from admixture with sodium chloride in a substantially pure state by extraction of the dried residue recovered by evaporation of the aqueous solution to dryness with 95% ethanol. The over-all yield of the product is 82% of theoretical, based upon the quantity of dodecane starting material. The product, when dissolved in water to the extent of 0.3% by weight, provides an aqueous detergent solution having a detergency substantially greater than a solution of laurylsulfate of the corresponding concentration of detergent therein.

Example II

A detergent having the following structural formula:

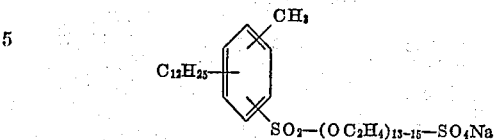

Sodium dodecyltolyl-[polyoxyethylene-ω-sulfato]-sulfone is prepared by subjecting a dodecyl-toluene alkylate hydrocarbon to chlorosulfonation to form the corresponding dodecyl-tolyl sulfonyl chloride, reacting the latter with ethylene glycol, condensing the resulting glycol sulfo-ester with ethylene oxide to introduce a poly-(oxyethylene) chain into the structure of the compound, sulfating the terminal hydroxyl group at the end of the poly-(oxyethylene) chain to form the acid sulfate ester, and neutralizing with sodium hydroxide to form the sulfate ester product.

For the above series of reactions, dodecyltoluene is reacted with 1.2 molecular equivalents of chlorosulfonic acid at 40° C. and at atmospheric pressure for 3 hours, the sulfonyl chloride is separated by vacuum distillation, and thereafter molar excess (6 mols) of ethylene glycol is added to the sulfonyl chloride to effect the mono-esterification reaction. The resulting ester containing a free terminal hydroxyl group after being separated from the excess glycol, is reacted with ethylene oxide to introduce a hydrophilic poly-(oxyethylene) chain into the structure of the compound. For this purpose, about 12–14 molar proportions of liquid ethylene oxide per mole of the prepared glycol-sulfo-ester and about 2 weight percent of powdered sodium hydroxide are introduced into a rotating pressure autoclave, the autoclave sealed, pressured with nitrogen to a gage pressure of 200 lbs./in.$^2$ and heated to a temperature of 100° C. for 2 hours as the autoclave is slowly rotated, during which time the ethylene oxide reacts completely. The product of the reaction is removed from the autoclave, and the poly-(oxyethylene) condensation product of the glycol-sulfo-ester recovered in a yield of approximately 87% of theoretical, based upon the initial charge of dodecyltoluene. The product is a waxy solid and is readily dissolved in both hot and cold water. When tested for its detergency in accordance with standard procedures therefor, utilizing a Launder-O-Meter, the product has a detergency somewhat greater than a sodium sulfate built alkylarylsulfonate (dodecylbenzene sulfonate) detergent.

The above product may be converted to a solid salt-like material of substantially greater solubility in water by converting the above product to its sodium sulfate derivative. In the latter conversion, the ethylene oxide condensation product of the dodecyltolyl-hydroxyethyl sulfonate, as prepared above, is sulfated with concentrated (98.5%) sulfuric acid at a temperature of 40° C., utilizing 5 molar proportions of acid per mole of condensation product, which is added to the latter gradually, and with stirring over a period of 2 hours, cooling, if necessary, to maintain the temperature at approximately 40° C. The reaction mixture when neutralized with sodium hydroxide, evaporated to dryness and extracted with 95% ethanol to separate the organic product from the sodium sulfate by-product has substantially the same detersive efficiency at optimum concentrations as the unsulfated sulfo-ester and much greater solubility in both hot and cold water.

In the preparation of the unsulfated intermediate detergent product, greater or lesser amounts of ethylene oxide may be introduced into the condensation reaction mixture to produce products having correspondingly longer or shorter poly-(oxyethylene) chain lengths. The products thus produced vary in their water solubility in direct proportion to the number of oxyethylene units per chain. In general, the greatest detergency for the dodecyltolyl sulfo-esters of ω-sodium sulfato-poly-(oxyethylene)-ethanol are those members of the series containing from 10 to about 20, preferably from 12 to 16, oxyethylene units per molecule.

Example III

A surface active agent having the following structural formula:

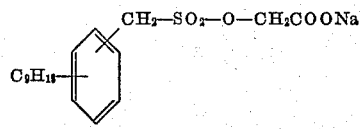

Nonylbenzyl-sodium carboxymethoxy-sulfone is prepared by chloromethylating nonylbenzene, reacting the resulting nonylbenzylchloride with sodium sulfite to form the corresponding sodium nonylbenzyl sulfonate and thereafter reacting the latter salt with sodium chloroacetate to form the surface active product hereinabove designated.

Chloromethylation of nonylbenzene is effected in the presence of a mild Friedel-Crafts catalyst by reaction of chloromethyl ether under conditions whereby a single chloromethyl group is substituted on the aryl nucleus. In order to prevent polychloromethylation a molar excess of nonylbenzene is utilized in the reaction. Ten moles of nonylbenzene, two volumes of carbon disulfide and five moles of chloromethyl ether in a stirred flask, and 25 weight percent of anhydrous stannic chloride (based on the ethers) are added dropwise, while cooling to maintain a temperature of 15–20° C. After all of the catalyst has been added, the mixture is stirred for an additional hour, then poured onto ice, the organic layer separated, washed, and distilled to recover the desired nonylbenzylchloride. A yield of 60% of theoretical, based on the quantity of chloromethyl ether charged, is recovered (B. P. 125–127$_2$ mm.; $n_D^{20}$=1.5150, chlorine content: 13.4% found, calculated 13.3%).

The nonylbenzylchloride is thereafter mixed with a molar excess of sodium sulfite in concentrated aqueous solution and the mixture heated to a temperature of 120° C. in a stirred autoclave for 3 hours, with stirring, to form the nonylbenzylsodium sulfonate derivative, utilized in the following reactions.

The sulfonate product prepared as indicated above is thereafter mixed with a molar excess (1.5 moles per mole of sulfonate) of anhydrous, finely powdered, sodium chloroacetate and heated to a temperature of 150° C. with stirring for a period of 1.5 hours. The resulting reaction mixture is cooled, and thereafter extracted with anhydrous methanol to recover the desired organic detergent salt from the inorganic components of the reaction mixture. The alcohol extract solution, when evaporated to dryness, yielded the surface active product hereinabove indicated, that is, the sodium salt of nonylbenzyl-carboxymethoxysulfone. When tested for its detergency in soft water, its effectiveness for this purpose is approximately as great as that of the sodium salt of oleic acid.

Certain alkylphenyl-mono-chloroalkanes may be prepared by alkylation of the appropriate phenyl-alkylhalides containing from 1 to 5 carbon atoms in the alkyl group of the phenylalkylhalide. The sulfonates derived from these may be condensed with other halo-aliphatic acids to provide a series of products having surface activity, although the acetic acid derivatives are, in general, preferred in this synthesis.

Example IV

A product having surface activity in both aqueous and non-aqueous solvents, and referred to as: ω-(N-diethanolamino)-ethoxy-dodecylsulfone having the following structure:

$$C_{12}H_{25}-SO_2-O-C_2H_4-N(C_2H_4OH)_2$$

is prepared by reacting dodecane (hydrogenated propylene tetramer fraction) with sulfur dioxide and chlorine and reacting the product with tri-ethanolamine in the presence of aqueous sodium carbonate. In this reaction, dodecane is sulfochlorinated in the manner described in Example I, and the recovered reaction product is mixed with a molar equivalent of tri-ethanolamine dissolved in dilute aqueous sodium carbonate solution. The reaction is continued until all of the sulfonyl chloride is esterified with alcoholic hydroxyl groups, the product being then recovered from the aqueous solution by extraction with diethyl ether and subsequent removal of the diethyl ether.

This product is a soft, waxy, semi-solid material, soluble in water and liquid hydrocarbons, as well as alcohols, ethers, ketones, etc., which solutions exhibit surface active properties. A 0.3% aqueous solution of the product, when tested in a Launder-O-Meter, utilizing the standard detergent test procedure, for example, exhibits approximately the same detergency as an aqueous solution of sodium sulfate-built sodium dodecylbenzene sulfonate of equivalent concentration.

A more water-soluble, hydrocarbon-insoluble product is prepared from the above-indicated diethanol-amino-ethoxy-dodecylsulfone by reacting the latter with ethylene oxide under conditions whereby the terminal hydroxyl groups undergo multiple condensation with the ethylene oxide to form poly-(oxyethylene) chains which increase the water solubilizing effect of the hydrophilic radicals. The resulting product has the following structure:

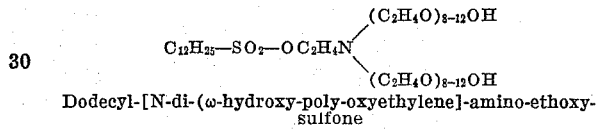

Dodecyl-[N-di-(ω-hydroxy-poly-oxyethylene]-amino-ethoxy-sulfone

In the preparation of this product, one molar proportion of the ω-(N-diethanolamino)-ethoxy-dodecylsulfone, prepared as indicated above, is mixed with approximately 14–22 molar proportions of ethylene oxide and about 2 weight percent of sodium acetate in a rotating pressure autoclave, the ethylene oxide being charged into the autoclave as a liquid. The pressure within the autoclave is increased to 150 lbs./in.$^2$ with compressed nitrogen and the autoclave heated to a temperature of 120° C. as the reaction mixture is stirred by rotation of the autoclave. After 3 hours, the product of the reaction is allowed to solidify by cooling to room temperature. The product is a hard, waxy solid, very soluble in water and slightly soluble in pentane or benzene.

The detergency of the product, as determined by a Launder-O-Meter test procedure is approximately 120% of the detergency of sodium dodecylbenzene-sulfonate at equivalent concentration in aqueous solution, as indicated by its ability to whiten soiled cotton muslin in the detergency test procedure.

I claim as my invention:

1. A compound selected from the group consisting of dodecyl-(sodium sulfoethoxy)-sulfone, sodium dodecyl-tolyl-(polyoxyethylene-ω-sulfato)-sulfone containing an average of from about 13 to about 15 oxyethylene units in the polyoxyethylene radical, ω-(N-diethanolamino)-ethoxy - dodecylsulfone, dodecyl-[N-di-(ω-hydroxy-polyoxyethylene)]-amino-ethoxysulfone containing an average of from about 8 to about 12 oxyethylene units per polyoxyalkylene chain, and diethanol-aminoethoxy-dodecylphenylsulfone.

2. Dodecyl-(sodium sulfoethoxy)-sulfone.

3. Sodium dodecyltolyl-(polyoxyethylene - ω - sulfato)-sulfone containing an average of from about 13 to about 15 oxyethylene units in the polyoxyethylene radical.

4. ω-(N-diethanolamino)-ethoxy dodecylsulfone.

5. Dodecyl - [N - di - (ω - hydroxy-polyoxyethylene)]-amino-ethoxysulfone containing an average of from about 8 to about 12 oxyethylene units per polyoxyalkylene chain.

6. Diethanol-aminoethoxy-dodecylphenyl-sulfone.

(References on following page)

References Cited in the file of this patent

UNITED STATES PATENTS

| | | |
|---|---|---|
| 1,970,578 | Schoeller et al. | Aug. 21, 1934 |
| 2,208,581 | Hoeffelman | July 23, 1940 |
| 2,260,384 | Kritchevsky | Oct. 28, 1941 |
| 2,266,141 | Adams | Dec. 16, 1941 |
| 2,278,170 | De Groote et al. | Mar. 31, 1942 |
| 2,363,046 | De Groote et al. | Nov. 21, 1944 |
| 2,454,543 | Bock et al. | Nov. 23, 1948 |
| 2,486,417 | Jackson et al. | Nov. 1, 1949 |

OTHER REFERENCES

McCutcheon: Synthetic Detergents, 1950, pp. 45–6.